United States Patent [19]

Modic et al.

[11] Patent Number: 4,954,533
[45] Date of Patent: Sep. 4, 1990

[54] LOW VISCOSITY SILICONE FOAM COMPOSITIONS

[75] Inventors: Frank J. Modic, Scotia; Richard A. Striker, Troy, both of N.Y.

[73] Assignee: General Electric Company, Waterford, N.Y.

[21] Appl. No.: 381,426

[22] Filed: Jul. 18, 1989

Related U.S. Application Data

[62] Division of Ser. No. 225,903, Jul. 29, 1988, Pat. No. 4,871,782.

[51] Int. Cl.$^5$ ............................. C08J 9/02; C08J 9/04
[52] U.S. Cl. ......................................... 521/82; 521/88; 521/91; 521/134; 521/154
[58] Field of Search ................... 521/88, 91, 134, 154, 521/82

[56] References Cited

U.S. PATENT DOCUMENTS

| | | | |
|---|---|---|---|
| 3,923,705 | 12/1975 | Smith | 521/154 |
| 4,189,157 | 2/1980 | Modic | 521/154 |
| 4,418,157 | 11/1983 | Modic | 521/154 |
| 4,461,851 | 7/1984 | Hashimoto | 521/154 |
| 4,599,367 | 7/1986 | Boilerman | 521/154 |
| 4,762,859 | 8/1988 | Modic | 521/154 |
| 4,871,782 | 10/1989 | Modic et al. | 521/88 |

*Primary Examiner*—Morton Foelak

[57] ABSTRACT

Low viscosity elastomeric silicone foam compositions are produced which do not bleed, split or rupture with cure where viscosity is controlled by controlling the content of the vinyl containing polysiloxane portion of the foam.

2 Claims, No Drawings

LOW VISCOSITY SILICONE FOAM COMPOSITIONS

This application is a division of application Ser. No. 07/225,903, filed July 29, 1988 now U.S. Pat. No. 4,871,782.

This invention relates to low viscosity silicone foam compositions. More particularly, this invention relates to addition cured silicone foam compositions containing reactive diluents to reduce viscosity prior to blowing and cure.

BACKGROUND OF THE INVENTION

Elastomeric silicone foams are well known and have a variety of uses, including thermal insulation, electrical insulation, flame barrier, cushioning applications, etc. Elastomeric silicone foams have excellent physical properties and in addition to the above uses are suitable and desirable for use in many additional applications. However, there is a problem with addition cured elastomeric silicone foam that the viscosity of the composition prior to blowing and cure cannot be reduced simply by reducing the viscosity of the inputs. Particularly, such foam cured from vinyl end-stopped polydiorganosiloxane will split and tear during the foaming process where the viscosity of the polydiorganosiloxane is too low.

In the past the inventors herein have relied on solvents or diluents to reduce viscosity. However, this method of viscosity reduction leads to solvent emission problems as well as bleed.

The instant invention is best understood with knowledge of prior art foam references. Smith, U.S. Pat. No. 3,923,705, discloses that elastomeric silicone foams may be produced with a single reaction that both cross-links to cure the composition as well as produces hydrogen gas to blow the foam. This reaction takes place between a silanol and silicon hydride. Optionally, there can be added a vinyl containing silicone that will simultaneously cross-link through addition with a silicon hydride without gas generation. Obviously, this is a convenient method to produce silicone foam.

Modic, U.S. Pat. No. 4,189,545, produces silicone foam compositions by adding water. For example, water could be added to a composition of a vinyl containing siloxane, a hydride containing siloxane and platinum to generate gas at a rate only indirectly related to cross-linking rate. The water reacts with hydride containing siloxane to produce hydrogen gas and silanol. Silanol reacts with hydride containing siloxane to cross-link and produce a second molecule of hydrogen gas. A vinyl addition reaction with silicone hydride will cross-link the composition simultaneously.

Modic, U.S. Pat. No. 4,418,157, reduces density and strengthens silicone foam by adding a resinous copolymer. Baumann, et al., U.S. Pat. No. 4,599,367, reduces density by using a combination of silanol and water. U.S. Pat. No. 4,762,859 reduces foam density by the addition of nitrogen containing compounds.

It is an object of the present invention to produce low viscosity, foamable silicone compositions which do not bleed and which do not split and tear with foaming.

It is a further object of the present invention to produce a foamable silicone composition which will flow easily into crevices and will easily conform to the shape of a mold.

These and other objects of the present invention are accomplished by means of the disclosure set forth hereinbelow.

SUMMARY OF THE INVENTION

Briefly, there is provided by the present invention a reduced viscosity foamable composition comprising:

(a) 100 parts by weight vinyl-containing polysiloxane comprising:
  (i) vinyl endcapped polysiloxane composition having a viscosity between about 10,000 and 1,000,000 centipoise at 25° C. and containing vinyl endcapped polysiloxane having the formula:

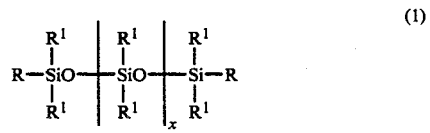

(1)

where R is vinyl and $R^1$ is selected from substituted or unsubstituted hydrocarbon radicals of from 1 to 20 carbon atoms, such that the polymer contains from 0.0002 to 3% by weight vinyl and x varies such that the viscosity of said vinyl endcapped polysiloxane varies from 100 to 1,000,000 centipoise at 25° C., and (ii) in an amount of from 1/9 to 9/1 by weight to said vinyl endcapped polysiloxane composition a low viscosity vinyl-containing polysiloxane composition comprising low viscosity vinyl-containing polysiloxane having the formula

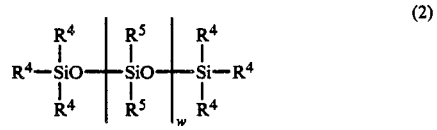

(2)

where $R^4$ and $R^5$ are selected from substituted or unsubstituted hydrocarbon radicals of from 1 to 20 carbon atoms, at most, one $R^4$ is vinyl, the polymer contains 0.0002 to 1% by weight vinyl, and w varies such that the viscosity of said low viscosity vinyl-containing polysiloxane varies from 50 to about 2,000 centipoise at 25° C.;

(b) from 1 to 50 parts by weight of a hydride polysiloxane of the formula:

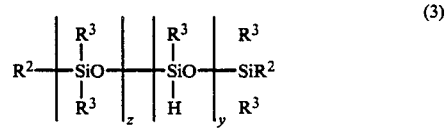

(3)

where $R^2$ is selected from the group consisting of independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b); and (d) from about 1 to about 250 parts per million of platinum catalyst.

DETAILED DESCRIPTION OF THE INVENTION

Desirably, the foamable composition herein should have a sufficiently low viscosity to easily flow into spaces having small openings. Specifically, the foamable composition should have a viscosity between 1,000 centipoise and 15,000 centipoise at 25° C. and preferably between 2,000 centipoise and 10,000 centipoise. Of course, several factors effect viscosity of the foamable composition but taking advantage of the invention herein facilitates obtaining such viscosities.

The vinyl endcapped polysiloxane composition of component (a)(i) is comprised, as stated above, of vinyl endcapped polysiloxane as shown in formula (1). Therein, R is vinyl and $R^1$ may be substituted or unsubstituted hydrocarbon radicals of from 1 to 20 carbon atoms with the proviso that there is controlled vinyl substitution and controlled viscosity. The vinyl substitution should range from about 0.0002 to 3% by weight and preferably, from about 0.001 to about 1% by weight. Viscosity of the vinyl endcapped polysiloxane should vary from about 100 to about 1,000,000 centipoise at 25° C. and preferably, from about 2500 to 500,000 centipoise. Although a polymer having a broader range of vinyl content will operate in the present invention, the more limited vinyl concentration given above will allow for a reaction that proceeds at an appropriate rate, that is not too slow and allows for proper cross-linking in the polymer to produce cured elastomeric silicone foam. As opposed to the polymer shown in formula (1), the composition should have a viscosity ranging from 10,000 to 1,000,000 centipoise at 25° C. or preferably from 20,000 to 100,000 centipoise at 25° C. This viscosity range is meant to approximate a useful viscosity range for vinyl endcapped polysiloxane in silicone foams for which foam splitting or ripping is not a severe problem.

Substituted or unsubstituted hydrocarbon radicals of $R^1$ may be selected from alkyl radicals, methyl, ethyl, propyl, etc.; cycloalkyl radicals such as cyclohexyl, cycloheptyl, etc; mononuclear aryl radicals such as phenyl, methyl phenyl, ethylphenyl, etc.; alkenyl radicals such as vinyl, allyl, etc. and more preferably vinyl and other well known substituent groups for diorganopolysiloxane polymers. Preferably the $R^1$ radicals are selected from the class consisting of alkyl radicals of 1 to 8 carbon atoms, aryl radicals such as phenyl; vinyl radicals and halogenated hydrocarbon radicals such as fluoroalkyl radicals of 3 to 8 carbon atoms, including, for instance 3,3,3-trifluoropropyl. Most preferably $R^1$ radicals are selected from methyl radicals, phenyl radicals, vinyl radicals and 3,3,3-trifluoropropyl radicals where the polymer has the foregoing vinyl substitution. Although vinyl endcapped polysiloxane may have vinyl substitution on chain within the bounds of formula (1), it may be advantageous to have only terminal vinyl substitution. Thus, a particularly preferred polymer has only terminal vinyl substitution, i.e. where R is vinyl and $R^1$ is methyl, phenyl, and/or 3,3,3-trifluoropropyl.

Vinyl endcapped polysiloxanes are well known in the art and may be produced by a variety of methods, for instance, by equilibrating cyclic polysiloxanes with or without vinyl substitution in the presence of appropriate amounts of vinyl substituted chainstopper. Further details for production of vinyl-substituted polysiloxanes may be found in Modic U.S. Pat. No. 3,425,967. Further suitable vinyl-containing polysiloxanes may be found in U.S. Pat. Nos. 4,599,367; 4,418,157 and 3,923,705, all of which are incorporated herein by reference.

The low viscosity vinyl-containing polysiloxane composition of component (a) (ii), as stated above, is comprised of low viscosity vinyl-containing polysiloxane of formula (2) and may be employed as needed to lower viscosity without resultant foam splitting or ripping. Therein $R^4$ and $R^5$ may be substituted or unsubstituted hydrocarbon radicals of from 1 to 20 carbon atoms with the proviso, as in (a) (i) that there is controlled vinyl substitution and controlled viscosity. The vinyl substitution should range from about 0.0002 to 1% by weight and preferably from about 0.001 to about 0.5% by weight. Importantly, at most one $R^4$ may be vinyl. Thus it is a critical distinction between component (a) (i) and component (a) (ii) that component (a) (ii) not have two terminal vinyl groups. Viscosity of the low viscosity vinyl-containing polysiloxane should vary from 50 to about 2,000 centipoise at 25° C. and preferably from about 100 to 1500 centipoise. It is believed to be the controlled vinyl placement and content on this polymer which permits its use as a reactive diluent while preventing splitting or ripping of low viscosity foam. Component (a) (ii) should be employed as necessary to reduce overall foam composition viscosity. It is clear, however, that there are limitations on the extent to which component (a) (ii) can reduce viscosity and how much it is prudent to employ from a physical property standpoint. As a general matter, from about 1/9 to 9/1 by weight low viscosity vinyl-containing polysiloxane composition should be employed to vinyl endcapped polysiloxane. Preferably, however, there should be employed from about 1/6 to about 3/2 by weight component (a) (ii) to component (a) (i).

Substituted or unsubstituted hydrocarbon radicals of $R^4$ and $R^5$ are generally those described above for $R^1$. $R^4$ differs from $R^1$, however, in certain specifics. On each molecule of formula (2) there may be 0 or 1 $R^4$ which is vinyl or more broadly an alkenyl radical. Thus, the definition of $R^4$ differs from that of $R^1$ in that for some instances $R^4$ may not be alkenyl. As with $R^1$, $R^4$ and $R^5$ radicals are most preferably selected from methyl radicals, phenyl radicals, vinyl radicals and 3,3,3-trifluoropropyl radicals where the polymer has the foregoing vinyl substitution. Although the low viscosity vinyl containing polysiloxane may have a single vinyl substitution as an endcap within the bounds of formula (2), it may be advantageous to have only on chain vinyl substitution. Thus, a particularly preferred polymer has only on chain vinyl substitution with all $R^4$ and other $R^5$ selected from methyl, phenyl and/or 3,3,3-trifluoropropyl.

Optionally, there may be included in the vinyl-containing polysiloxane, component (a), a vinyl substituted MQ or MDQ resin. These vinyl resins function to lower density and increase strength. Resins of this type contain at least units of the formula $R^6_3SiO_{\frac{1}{2}}$, i.e. M units, and units of the formula $SiO_{4/2}$, Q units, where $R^6$ is a substituted or unsubstituted hydrocarbon radical of from 1 to about 20 carbon atoms, the resin contains from 0.1 to 10% by weight vinyl, and the ratio of M to Q ranges from 1/10 to about 2.5/1 by number with the preferred ratio being from 1/5 to about 1.5/1. Further, the resin might contain up to 15% by number based on M and Q units of the formula $R_2^6SiO_{2/2}$, i.e. D units. Examples of MQ or MDQ resins are resins containing units of $R_2^6ViSiO_{\frac{1}{2}}$ and $SiO_{4/2}$; $R_3^6SiO_{\frac{1}{2}}$,
$R_2^6ViSiO_{\frac{1}{2}}$ and $SiO_{4/2}$; $R_3^6SiO_{\frac{1}{2}}$,
$R^6ViSiO_{2/2}$, and $SiO_{4/2}$; $R_2^6ViSiO_{\frac{1}{2}}$,
$R_2^6SiO_{2/2}$ and $SiO_{4/2}$; or $R_3^6SiO_{\frac{1}{2}}$.
$R_2^6SiO_{2/2}$, $R^6ViSiO_{2/2}$, and $SiO_{4/2}$.

Substituted or unsubstituted hydrocarbon radicals of $R^6$ are generally those defined above for $R^1$. Most preferably, $R^6$ is vinyl, methyl, phenyl and/or 3,3,3-trifluoropropyl.

The vinyl substituted MQ or MDQ resin may be employed in amounts effective to increase strength and lower density. Generally it should be employed in an amount to component (a) (i) of from about 1/20 to about 1/1.5 by weight. Preferably this ratio is from about 1/10 to about 1/3. The use of these resins is further described in U.S. Pat. No. 4,418,157, incorporated by reference.

For each 100 parts by weight of vinyl-containing polysiloxane, component (a), there should be present in the foamable composition from about 1 to 50 parts by weight of hydride polysiloxane, component (b), and preferably, from about 5 to 30 parts by weight. As shown above in formula (2), $R^2$ may be independently hydrogen, an alkyl radical of from 1 to 8 carbon atoms, an aryl radical from 1 to 8 carbon atoms or a haloalkyl radical of 3 to 8 carbon atoms or simultaneously a single —O— to form a cyclic polymer and $R^3$ may be selected from the same radicals as $R^2$ absent hydrogen and oxygen. It is preferred that the hydride polysiloxane have a hydrogen content ranging from about 0.3 to about 1.6% by weight and as shown in formula (2), z and y vary to provide a viscosity ranging from 1 to 500 centipoise at 25° C. The hydride content is not critical but such a content substantially less than about 0.3% by weight of the hydride polysiloxane may not provide sufficient hydrogen in the foamable composition to react with the hydroxy source and liberate hydrogen gas as well as react and cross-link with vinyl molecules of the vinyl-containing polysiloxane. The result will of course be a poorly blown and undercured foam. Likewise, viscosity of the hydride polysiloxane is not critical, but higher viscosity materials may be difficult to obtain and utilize. Preferably, viscosity ranges from about 5 to about 250 centipoise at 25° C. and most preferably from about 5 to 100 centipoise.

As seen in formula (2) above, it is critical that the hydride polysiloxane contain hydrogen on the siloxane chain. It is optional that hydrogen atoms are a substituent on terminal siloxy atoms. If there are no hydrogen atoms in the polymer chain of the hydride polysiloxanes, then a proper silicone foam is not obtained. Accordingly, a hydride polymer with only hydrogen radicals on terminal siloxy atoms will not work to form a silicone foam in the composition of the instant case.

A hydroxyl source is necessary to properly blow the foamable composition. The source of hydroxyl may be selected from any of water, organic alcohol or silanol or mixtures thereof.

Suitable silanols include any hydroxylated organosiloxane or hydroxylated organosiloxane mixture having an average of 1 to 2.5 silicon-bonded hydroxyl radicals per molecule. The organo radicals can be any radical described above for R and $R^1$. The silanols may be homopolymers, copolymers or mixtures thereof. It is preferred that the silanol contain at least one organic radical in a molecule per silicon atom. Examples of suitable silanols include hydroxyl end-blocked polydimethylsiloxane, hydroxyl end-blocked polydiorganosiloxane having siloxane units of dimethylsiloxane and phenylmethylsiloxane, hydroxyl end-blocked polymethyl-3,3,3-trifluoropropylsiloxane and hydroxyl end-blocked polyorganosiloxane having siloxane units of monomethylsiloxane, dimethylsiloxane, with the monomethylsiloxane units supplying "on-chain" hydroxyl groups. The silanol also includes mixtures of hydroxylated organosiloxane polymers and hydroxylated organosilanes, such as mixture of hydroxyl end-blocked polydimethylsiloxane and diphenylmethylsilanol.

Organic alcohols suitable for use herein may be substituted or unsubstituted, mono or polyols, preferably having from about 1 to 12 carbon atoms. Substituent groups may serve to increase the solubility of the alcohol or to improve the dispersability of an insoluble species. Preferred organic alcohols include ethanol, propanol, butanol, lauryl alcohol, octyl alcohol, ethylene glycol, etc.

Each of the above enumerated hydroxyl sources may react with hydrogen of the hydride polysiloxane to produce hydrogen gas. Although this reaction is common and required of any hydroxyl source utilized, the by-product of the reaction may differ and produce other benefits or require attention as known to the art. Water will react with the hydride function to produce a hydroxyl function which can further react with a second hydride to produce additional gas and a cross-link site. Thus, where water is employed, additional gas will be generated as a benefit, but gassing after cure may occur. Silanol, due to good solubility in the composition characteristically produces gas immediately but may lead to problems of premature gelation. Organic alcohol does not as easily react with the hydride function and thus is generally used in silanol or water combinations. Silanol and water combinations have also been found particularly beneficial. Persons skilled in the art are familiar with each of the above. For further teaching there are U.S. Pat. Nos. 4,189,545; 4,418,157; 4,599,367; and 3,923,705, hereby incorporated by reference.

Depending on the hydroxyl source used there should be from about 0.02/1 to about 5/1 moles hydroxyl radicals employed from the hydroxyl source for each silicon-bonded hydrogen atom in the hydride polysiloxane of component (b). Of course, this ratio is broadly stated, particularly at the upper boundary in view of the fact that hydride functions must be available to react with vinyl functions for cross-linking and should not be consumed by hydroxy functions. However, where water or difunctional hydroxyl compounds are used and much cross-linking takes place through hydroxy/hydride reactions or where vinyl concentration is very high, then the hydroxyl function to hydride function ratio may also be high. Preferably however, the ratio of hydroxyl radicals to hydride radicals should vary between about 0.02/1 to 1/1 and more preferably between about 0.05/1 to about 0.5/1.

Suitable platinum compound for use as the catalyst herein are well known. The preferred platinum catalysts are soluble in the present reaction mixture. The platinum compound can be selected from those having the formula (PtCl$_2$.Olefin)$_2$ and H(PtCl$_3$.Olefin) as described in Ashby U.S. Pat. No. 3,159,601. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex (PtCl$_2$C$_3$H$_6$)$_2$ described in Ashby U.S. Pat. No. 3,159,662. Still further, the platinum containing material can be a complex formed from chloroplatinic acid with up to 2 moles per gram of platinum of a member selected from the class consisting of alcohols, ethers, aldehydes and mixtures of the above as described in Lamoreaux U.S. Pat. No. 3,220,972.

The preferred platinum compound to be used not only as a platinum catalyst, but also as a flame retardant additive is that disclosed in Karstedt U.S. Pat. No. 3,775,452. Generally speaking, this type of platinum complex is formed by reacting chloroplatinic acid containing 4 moles of water of hydration with tetramethyl-tetravinylcyclosiloxane in the presence of sodium bicarbonate in an ethanol solution.

Optionally the foamable composition herein may contain from 0 to 200 parts by weight by a filler, which may be either an extending or reinforcing filler. It should be noted that extending fillers are preferred since reinforcing filler such as fumed silica and precipitated silica when incorporated into the composition in any concentration unduly increases the viscosity of the composition, thus making it difficult to handle and to pour. However, fumed silica and precipitated silica have the advantages of increasing the physical properties, that is, the tensile strength as well as the tear of the silicone elastomeric foam that is formed from the composition.

Accordingly in the more preferred embodiment of the instant case there is utilized from 10 to 100 parts of filler based on 100 parts of the vinyl-containing base polymer. The filler may be selected from the class consisting of reinforcing fillers and extending fillers, and more preferably just extending fillers. A preferred extending filler that may be utilized in the instant composition which does not unduly increase the viscosity of the uncured composition is ground quartz. Ground quartz has the additional advantage that to some extent it increases the burn resistance properties of the cured silicone foam that is produced from the composition. Other extending fillers that may be utilized in the instant compositions are, for instance, titanium dioxide, lithopone, zinc oxide, zirconium silicate, silica aerogel, iron oxide, diatomaceous earth, calcium carbonate, glass fibers, magnesium oxide, chromic oxide, zirconium oxide, aluminum oxide, alpha quartz, calcined clay, carbon, graphite, etc.

It should be noted if reinforcing fillers are used such as fumed silica and precipitated silica, that in order to keep the viscosity increase in the composition as low as possible such filler, even the extending fillers, may be treated, for instance, with cyclicpolysiloxanes or silazanes. The disclosure in which silica fillers may be treated, for instance, with cyclicpolysiloxanes is set forth in Lucas U.S. Pat. No. 2,938,009, which is hereby incorporated by reference. However, such is only one method of treating reinforcing fillers and other methods with other agents are also available in the art.

Another method of treating reinforcing fillers is, for instance, to be found in Brown, U.S. Pat. No. 3,024,126, disclosure of which is hereby incorporated by reference; Smith, U.S. Pat. No. 3,635,743 and Beers, U.S. Pat. No. 3,837,878. Such ingredients such as cyclicpolysiloxanes may also be utilized to treat extending fillers such as, ground quartz, with some advantage since such treatment does also alleviate the viscosity increase caused by extending fillers. However, as stated previously, the most preferred filler for utilization to produce silicone foam of the instant case, is ground quartz. Quartz enhances the burn resistant properties of the composition as well as imparting some enhanced physical properties to the final cured silicone foam.

The foamable composition is generally used and stored as a multi-part composition in packages. The principle object of storing in packages is to keep separate the catalyst with the vinyl-containing polysiloxane and/or the hydroxyl source from the hydride polysiloxane. Herein it is recommended to employ three and preferably two packages. Vinyl-containing polysiloxane may be employed in any of the two or three packages in proportions as desired. The hydroxyl source and hydride polysiloxane should be entirely present in only one package separate from one another. The platinum catalyst may be present in either the package containing hydroxyl source or in a package containing vinyl-containing polysiloxane with no hydride polysiloxane. Persons skilled in the art will understand other suitable arrangements of packages.

When it is desired to form the silicone foam, the package of hydride polysiloxane is rapidly mixed with the packages of vinyl-containing polysiloxane, hydroxyl source and platinum, and the resultant composition is poured into the desired cavity and allowed to stand. The composition will begin to crosslink and generate gas simultaneously to blow and cure to an elastomeric silicone foam having a density of less than about 25 lb./ft.$^3$.

It is sometimes desired to have a certain amount of work life or pot life in the mixed composition prior to its cure. Accordingly, for such purposes, it is normal to use an inhibitor. It has been found that to the compositions of the instant case there is desirably used at least 200 parts per million based on the total composition of an inhibitor including a vinyl-containing cyclictetrasiloxane such as tetra methyl tetra-vinylcyclopolysiloxane, malleates or vinyl acetylene compounds. When added to the composition inhibitors give the composition some work life or pot life. Preferably inhibitors are added to the composition at a concentration of anywhere from 100 parts per million to 10,000 parts per million based on the total composition so as to give to the composition work life varying anywhere from 5 to 20 minutes at room temperature. Smaller amounts of inhibitor do not give an appreciable increase of work life at room temperature of the composition and larger amounts of the inhibitor may be used than 10,000 parts per million, per weight of the composition. However such has not been found to be necessary.

Of course, additional additives for foam are well known. Carbon black, pigment, glass fibers, etc. may be added according to the skill of the art. Particularly preferred additives are amine compounds or amine treated fillers to lower density. The addition of these materials is described in U.S. Pat. No. 4.762 859 and U.S. Ser. No. 113,292, filed Oct. 26, 1987, now U.S. Pat. No. 4,767,794 hereby incorporated by reference.

EXAMPLES

The examples below are given for the purpose of illustrating the practice of the above invention. They are not given for any purpose of setting limitations and defining the scope of the invention as set forth in the specification and claims. All parts are by weight.

Ingredients

Polymer * 80—di(vinyldimethyl) terminated polydimethyl siloxane, 80,000 centipoise at 25° C.

Polymer * 11—di(vinyldimethyl) terminated polydimethyl siloxane, 11,000 centipoise at 25° C.

Polymer * 3.5—di(vinyldimethyl) terminated polydimethylsiloxane, 3,500 centipoise at 25° C.

Resin—MD$^{vinyl}$Q resin, 2.4% by weight vinyl, M/Q is 1/1.8 by number

MeVi-Fluid—di(trimethyl) terminated polydimethylmethylvinyl siloxane, 0.45% by weight vinyl, 100 centipoise at 25° C.

MeVi$^2$—Fluid di(trimethyl) terminated polydymethylmethylvinyl siloxane, 1.27% by weight vinyl, 500 centipoise at 25° C.

ViMe-FLuid—di(vinyldimethyl) terminated polydimethyl siloxane, 0.34 by weight vinyl, 230 centipoise at 25° C.

MeMe-Fluid—di(trimethyl) terminated polydimethylsiloxane, 100 centipoise at 25° C.

Hydride—polymethylhydrogen, 50 centipoise at 25° C., 1.6% by weight hydrogen

Catalyst A—Karstedt platinum catalyst, U.S. Pat. No. 3,775,452

Catalyst B—platinum/methylvinyl, cyclic, tetramer complex

EXAMPLES 1–3

Compositions containing Polymer * 80 and resin were mixed to low viscosity according to the instant invention and allowed to stand at room temperature until foaming was complete. The ingredients and observations are shown in Table 1. Catalyst addition is shown in parts per million platinum.

TABLE 1

| Example | 1 | 2 | 3 |
|---|---|---|---|
| Polymer * 80 | 37.5 | 25 | 18.75 |
| Polymer * 3.5 | — | — | — |
| Resin | 12.5 | 8 | 6.25 |
| MeViFluid | 50 | 67 | 75 |
| MeVi$^2$ Fluid | — | — | — |
| ViMe Fluid | — | — | — |
| MeMe Fluid | — | — | — |
| H$_2$O | 3.3 | 3.3 | 3.3 |
| Hydride | 6.6 | 6.6 | 6.6 |
| Catalyst A | 30 ppm | 30 ppm | 30 ppm |
| Visc., cps | 5320 | 1650 | 750 |
| Gel time, sec | 130 | 65 | 44 |
| Foam lb/ft$^3$ | 16.7 | 21.2 | 27.2 |
| Observations | Good cells No splitting No bleed | Good cells No splitting No bleed Weak | Good cells No splitting No bleed Weak |

EXAMPLES 4–6

Compositions containing Polymer * 80 and resin were mixed to low viscosity with other diluents and allowed to stand at room temperature until foaming was complete. The ingredients and observations are shown in Table 2.

TABLE 2

| Example | 4 | 5 | 6 |
|---|---|---|---|
| Polymer * 80 | 37.5 | 37.5 | 37.5 |
| Polymer * 3.5 | — | — | — |
| Resin | 12.5 | 12.5 | 12.5 |
| MeViFluid | — | — | — |
| MeVi$^2$ Fluid | — | — | 50 |
| ViMe Fluid | — | 50 | — |
| MeMe Fluid | 50 | — | — |
| H$_2$O | 3.3 | 3.3 | 3.3 |
| Hydride | 6.6 | 6.6 | 6.6 |
| Catalyst A | 30 ppm | 30 ppm | 30 ppm |
| Visc., cps | 5310 | 6750 | 7250 |
| Gel time, sec | 109 | 80 | 145 |
| Foam lb/ft$^3$ | 15.7 | 19.3 | 30.4 |
| Observations | Good cells No splitting Bleed Soft | Good cells Split No bleed Hard | Good cells Split No bleed Weak Hard |

EXAMPLES 7 AND 8

Compositions containing Polymer * 3.5 and resin were mixed at low viscosity and allowed to stand at room temperature until foaming was complete. The ingredients and observations are shown in Table 3.

TABLE 3

| Example | 7 | 8 |
|---|---|---|
| Polymer * 80 | — | — |
| Polymer * 3.5 | 75 | 37.5 |
| Resin | 25 | 12.5 |
| MeViFluid | — | 50 |
| MeVi$^2$ Fluid | — | — |
| ViMe Fluid | — | — |
| MeMe Fluid | — | — |
| H$_2$O | 3.3 | 3.3 |
| Hydride | 6.6 | 6.6 |
| Catalyst A | 30 ppm | 30 ppm |
| Visc., cps | 4000 | 760 |
| Gel time, sec | 186 | 100 |
| Foam lb/ft$^3$ | 17.1 | 19.4 |
| Observations | Good cells Split No bleed Hard | Good cells Split No bleed Hard |

EXAMPLES 9–11

Compositions containing Polymer * 80 and Polymer * 11 were mixed and allowed to stand at room temperature until foaming was complete. The ingredients and observations are shown in Table 4.

TABLE 4

| Example | 9 | 10 | 11 |
|---|---|---|---|
| Polymer * 80 | 100 | 50 | — |
| Polymer * 11 | — | — | 100 |
| Resin | — | — | — |
| MeViFluid | — | 50 | — |
| MeVi$^2$ Fluid | — | — | — |
| ViMe Fluid | — | — | — |
| MeMe Fluid | — | — | — |
| H$_2$O | 3.3 | 3.3 | 3.3 |
| Hydride | 6.6 | 6.6 | 6.6 |
| Catalyst B | 30 ppm | 30 ppm | 30 ppm |
| Visc., cps | 92,000 | 9,100 | 11,000 |
| Gel time, sec | 151 | 220 | 200 |
| Foam lb/ft$^3$ | 11.7 | 13.9 | 11.8 |
| Observations | Good cells Split No bleed | Good cells No splitting No bleed | Good cells Split No bleed |

What is claimed is:

1. A foamable composition in packages comprising, a first package comprising:
   (a) from 0 to 100 parts by weight vinyl-containing polysiloxane comprising:
      (i) vinyl endcapped polysiloxane composition having a viscosity between about 10,000 and 1,000,000 centipoise at 25° C. and containing vinyl endcapped polysiloxane having the formula:

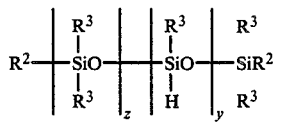

where R is vinyl and $R^1$ is selected from substituted or unsubstituted hydrocarbon radicals of from 1 to 20 carbon atoms, such that the polymer contains from 0.0002 to 3% by weight vinyl and x varies such that the viscosity of said vinyl endcapped polysiloxane varies from 100 to 1,000,000 centipoise at 25° C., and
      (ii) in an amount of from 1/9 to 9/1 by weight to said vinyl endcapped polysiloxane composition a low viscosity vinyl-containing polysiloxane composition comprising low viscosity vinyl-containing polysiloxane having the formula

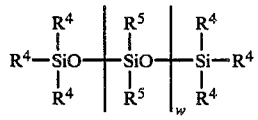

where $R^4$ and $R^5$ are selected from substituted or unsubstituted hydrocarbon radicals of from 1 to 20 carbon atoms, at most, one $R^4$ is vinyl, the polymer contains 0.0002 to 1% by weight vinyl, and w varies such that the viscosity of said low viscosity vinyl-containing polysiloxane varies from 50 to about 2,000 centipoise at 25° C.; and
   (b) from 1 to 50 parts by weight of a hydride polysiloxane of the formula:

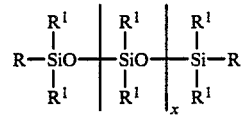

where $R^2$ is selected from the group consisting of independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;
a second package comprising:
   (a) from 0 to 100 parts by weight said vinyl-containing polysiloxane, of (i and ii) of component (a); and
   (c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b); and
a third package comprising:
   (a) from 0 to 100 parts by weight said vinyl-containing polysiloxane, of (i and ii) of component (a);
wherein the sum total of said vinyl-containing polysiloxane, of (i and ii) of component (a), is 100 parts and there is mixed with said vinyl-containing polysiloxane in either the second or third packages or both
   (d) from about 1 to about 250 parts per million based on said foamable composition of platinum catalyst.

2. The foamable composition of claim 1 in which vinyl-containing polysiloxane, component (a), additionally comprises:
   (iii) in an amount of from about 1/20 to 1/1.5 said vinyl endcapped polysiloxane composition, a vinyl-containing polysiloxane resin, said resin comprising units of the formula $R_3^6SiO_{\frac{1}{2}}$ and $SiO_{4/2}$ where $R^6$ is substituted or unsubstituted hydrocarbon radicals of from 1 to about 20 carbon atoms, said resin contains from about 0.1 to 10% by weight vinyl and the ratio of $R_3^6SiO_{\frac{1}{2}}$ to $SiO_{4/2}$ ranges from 1/10 to 2.5/1 by number.

* * * * *